Oct. 18, 1932.  W. DE BACK ET AL  1,883,606
APPARATUS FOR TREATING FOOD PRODUCTS
Filed July 10, 1928  6 Sheets-Sheet 1
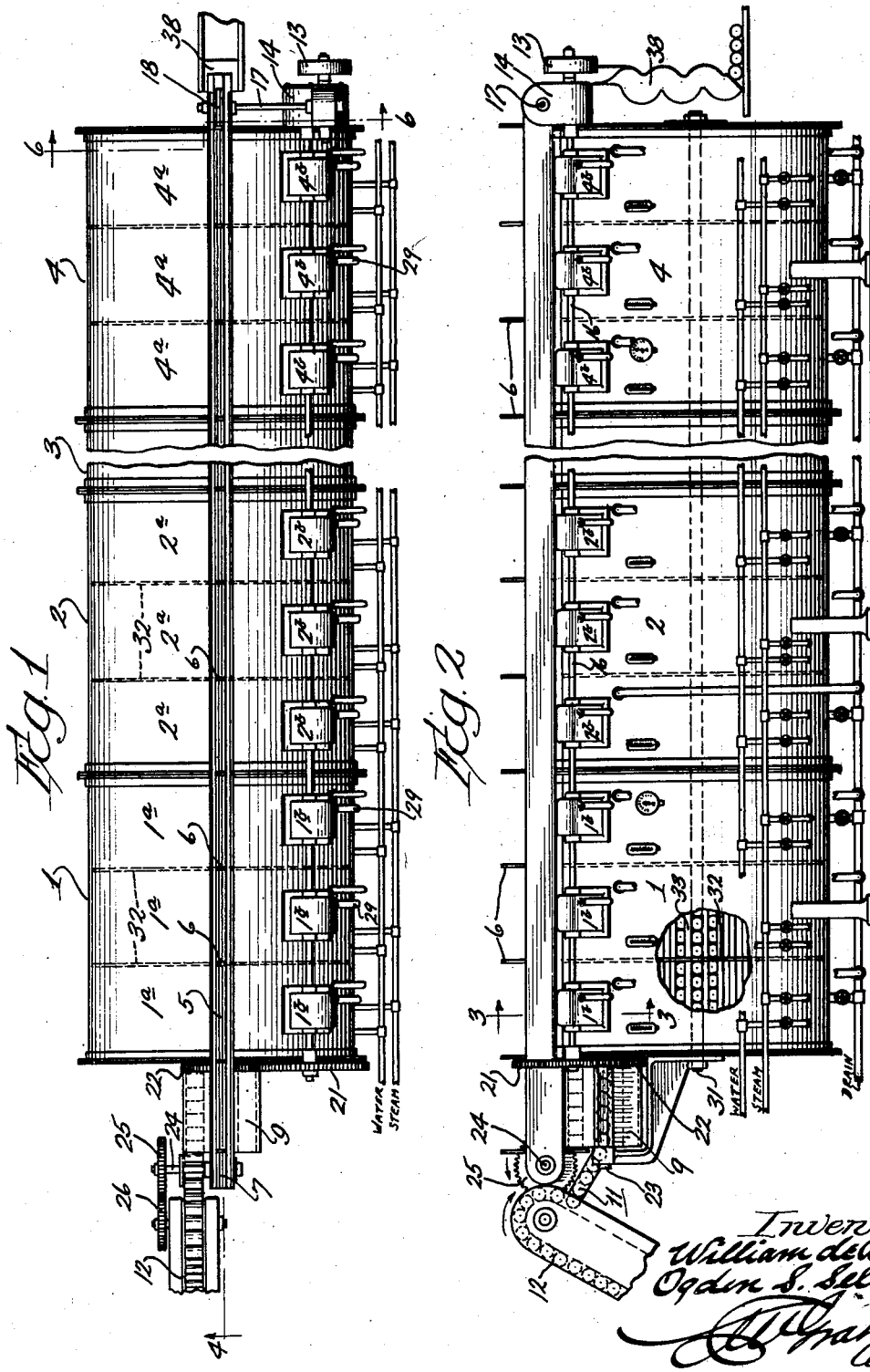

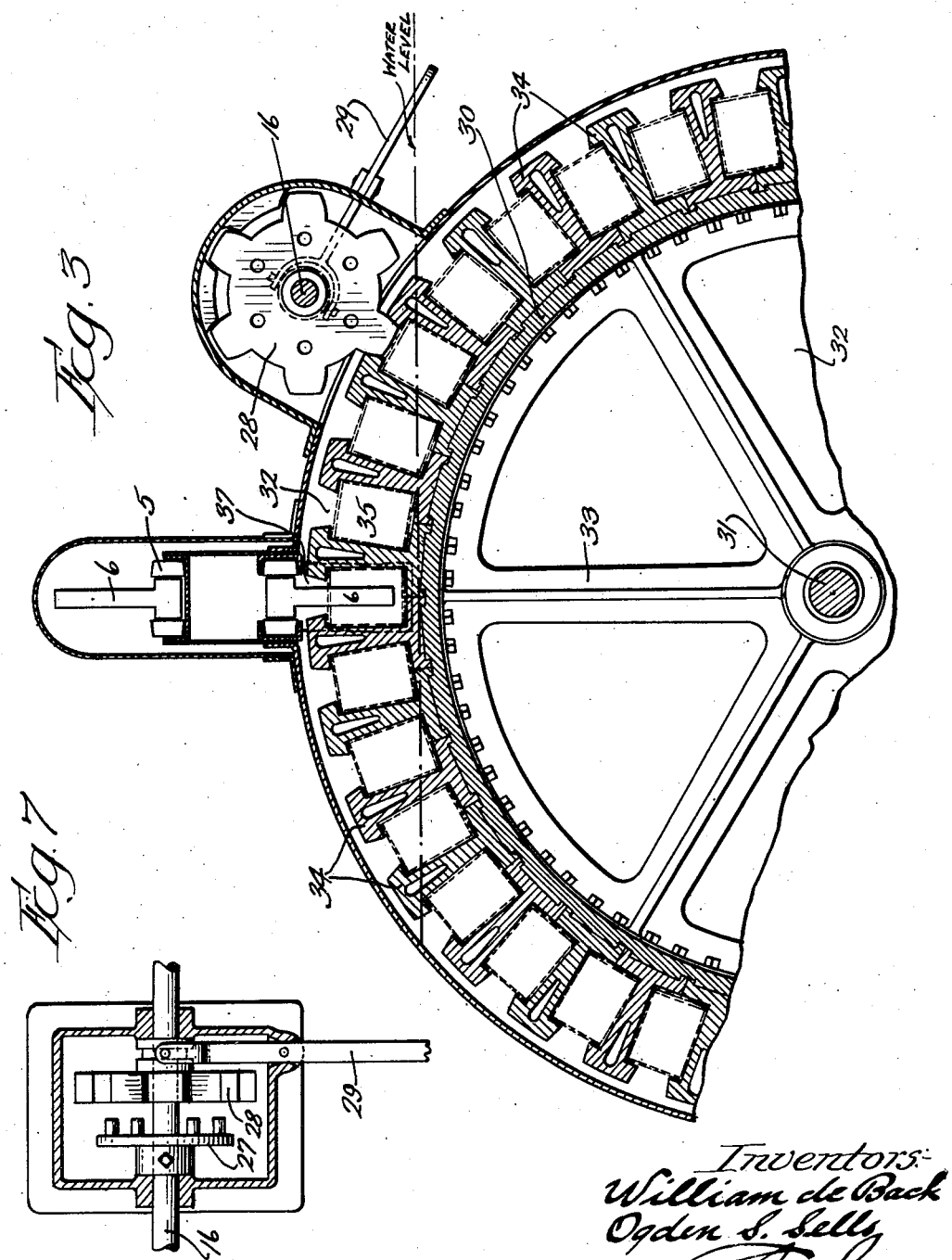

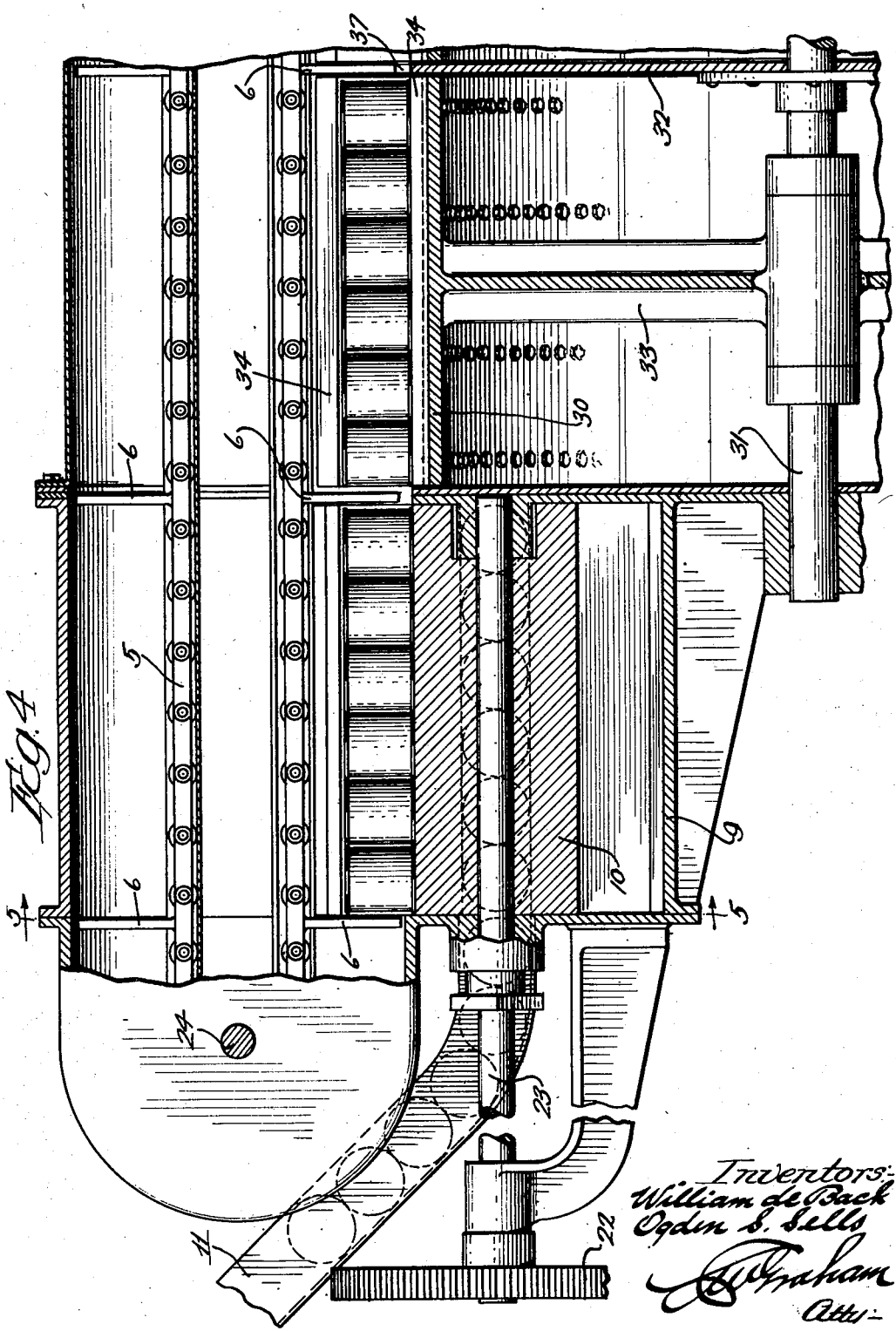

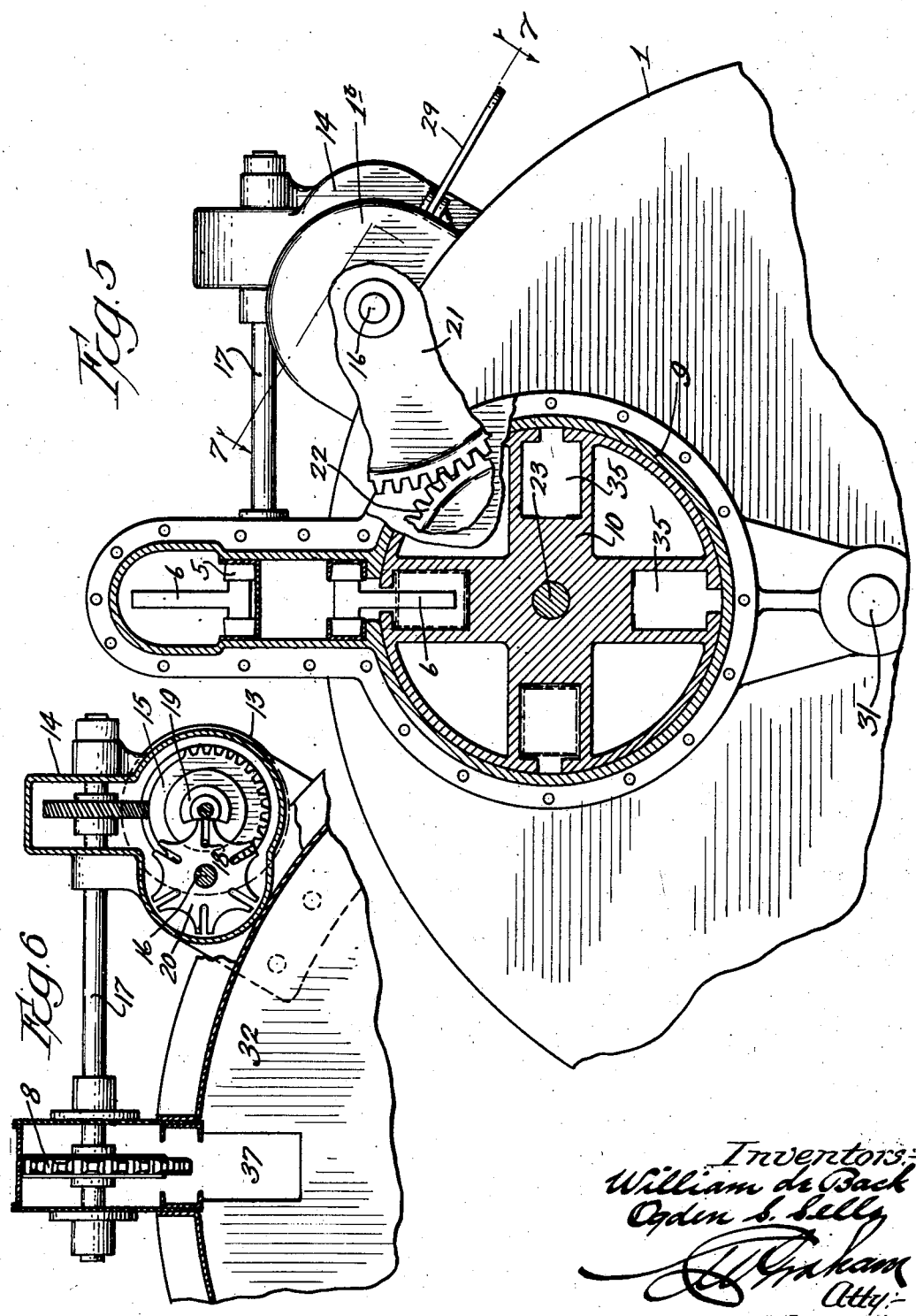

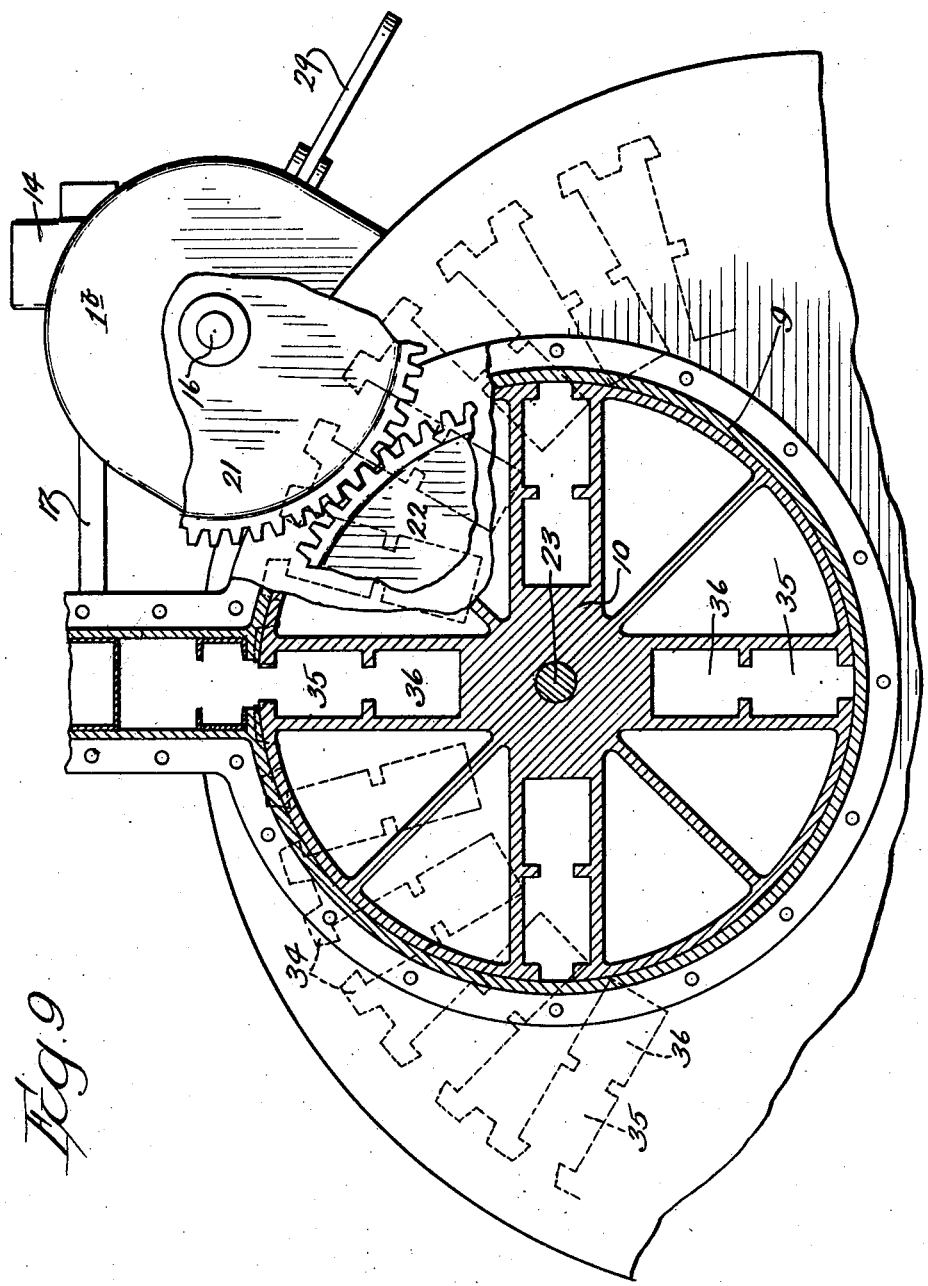

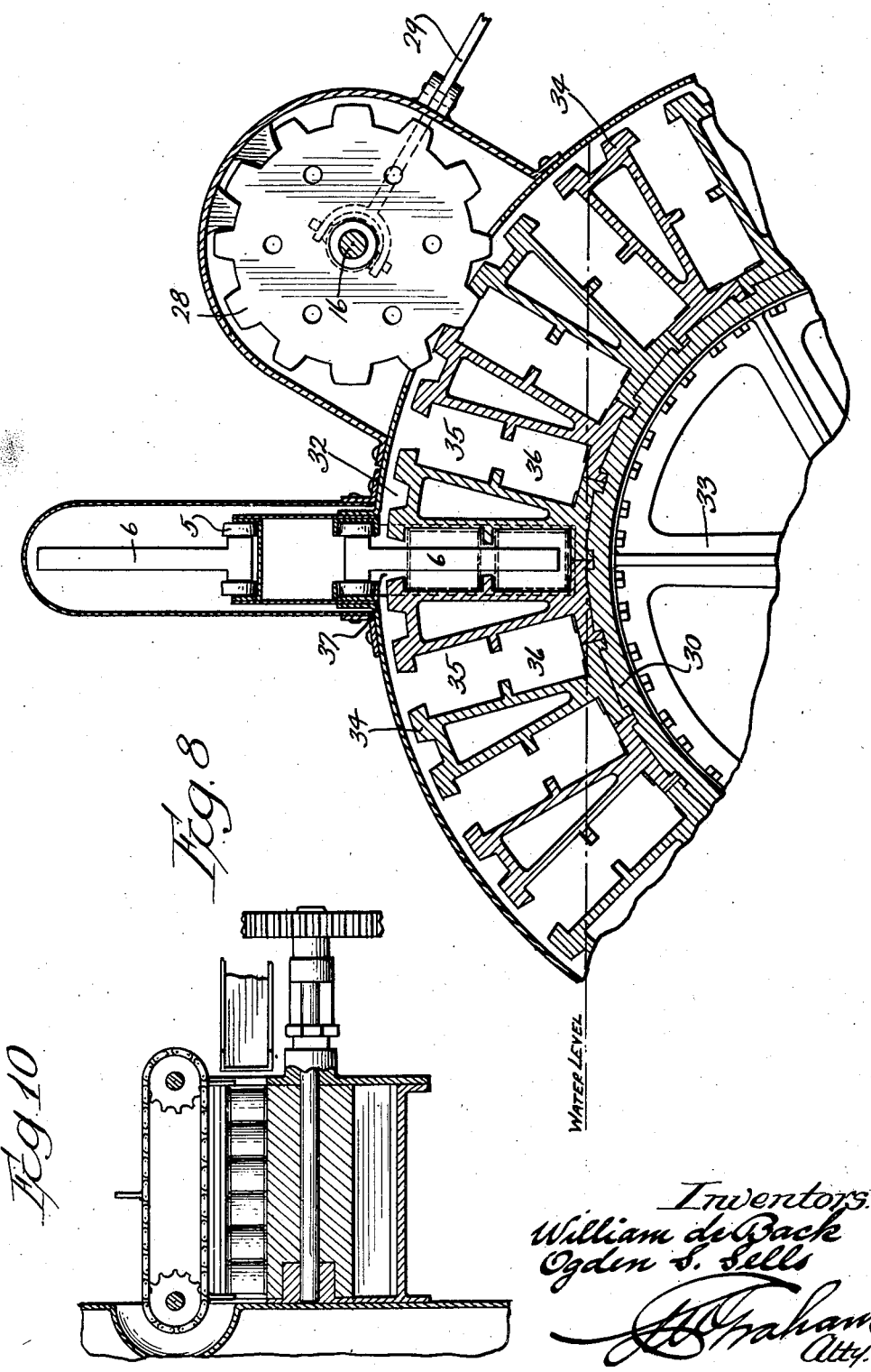

Patented Oct. 18, 1932

1,883,606

UNITED STATES PATENT OFFICE

WILLIAM DE BACK, OF HAYWARD, CALIFORNIA, AND OGDEN S. SELLS, OF HOOPESTON, ILLINOIS, ASSIGNORS TO SPRAGUE-SELLS CORPORATION, OF HOOPESTON, ILLINOIS

APPARATUS FOR TREATING FOOD PRODUCTS

Application filed July 10, 1928. Serial No. 291,625.

This invention relates to an improved apparatus for treating food and other products sealed in metallic or glass containers and is particularly adapted to the processing of food products that are hermetically sealed in the commercial tin cans.

Difficulties of various sorts and natures have been developed through the use of the ordinary commercial apparatus at the disposal of the canners. Many of these difficulties have had to be contended with because there was no other apparatus available that would handle the canner's product in a better manner. Applicants improved apparatus for treating food products in metallic containers has eliminated so many of the difficulties attending the ordinary commercial apparatus available to the canning industry that it seems desirable to enumerate some of the difficulties so that the reader will more readily appreciate the importance of the improvements made.

The treatment given the products for which this improved apparatus particularly applies has received various appellations throughout the industry, but is generally recognized as, cooking, processing or sterilizing wherein the food product is hermetically sealed in metallic or other suitable containers and is subjected to the heat of steam, hot water, hot air or from any other source for a specified time to suit the particular product being handled. This manner of finishing the canned product is necessary to prevent subsequent spoilage from fermentation or other deleterious actions that may develop in a sealed container not so treated.

There is almost an endless variety in the shapes and sizes of containers used for the marketing of food products, but there are two shapes that are used more generally than any others, these being the round and square, or oblong cans of varying heights and diameters. Practically any of the present commercial apparatus for process food products in sealed containers will handle the round cans but few if any will successfully handle the square or oblong cans, although there may be special apparatus constructed to handle the square or oblong cans which is practically then limited to that one use.

A canner putting up a variety of products extending over the canning season and sometimes well toward the end of a year desires apparatus that will handle any of his products in the best possible manner. Where he is equipped with the spiral can way type of apparatus he is more or less restricted in his operation because some products simply will not stand the agitation received by this type of apparatus and present a marketable appearance. In handling a variety of products it happens that they all require a different treatment as regards time of cook and temperature. Some present day apparatus will accommodate these requirements in a fashion but such apparatus is very bulky and very expensive and requires a vast amount of floor space. Where the product requires a pressure treatment in order to reach the desired temperature and it is desired to start the cook at a comparatively low temperature; increase to a maximum temperature as the cook progresses and then go down to a low pressure for finishing the cook, there has been no efficient apparatus to provide these conditions. Where the canner is running a variety of product on the same day it is desirable to have equipment that is instantly adaptable to the changed conditions and in which a variety of product may be run in succession without any change in the apparatus other than cutting in or out certain operative elements. Also in changing from one type of product to another it sometime happens that the can size changes as well. Present day equipment is not very efficient in automatically handling cans of varying size without adjustment for that size, which usually requires some hours of valuable time to effect and much of present day equipment is not made adjustable for different size and diameter cans, in which case the canner must have special equipment or not pack such product. An apparatus that will accommodate round cans of any reasonable variation in diameter and height and will at the same time, without adjustment of any kind or nature take and treat square or oblong cans of food or other products would seem to place a canner in a most advantageous position regarding the handling and treating of his product and would enable him to pack much more and a greater variety in a minimum of time and expense.

All processed cans where pressure is used should be cooled under substantially the same pressure in order to prevent undue damage to the metal container. This is usually accomplished by a separate cooling unit operating in conjunction with the cooker and having means for transferring the hot cans from the cooker to the cooler while still maintaining them under pressure. If the canner had a sectional cooker wherein he could use any section at will either as a cooking section or as a cooling section without structural change or adjustment but by simply changing the treating medium within the sections he would have a very versatile and efficient arrangement. Also by having his cooker built up of sections he would be enabled to cut the unused sections out of operation on short time cooks, thereby saving in heat element, power and wear and tear on the unused apparatus.

Applicants invention provides the desirable features enumerated and eliminates the difficulties referred to. Not all of the desirable features nor all of the difficulties have been enumerated, others may be pointed out in the following narrative.

Applicants invention broadly, comprises substantially the following construction.

A horizontal cylindrical structure made up of unit sections, of such number as may be necessary to fulfill the requirements of an individual canner, constitutes the whole of this apparatus. Each unit is a complete element for carrying out the cooking or processing operation for any food product put into cans that require a process of this nature. The sections or unit cookers are all of the same diameter and are capable of assemblage end to end to build up any length cooker desired. There is a special inlet structure and a special exit structure secured to opposite ends of the assembled apparatus. Each section comprises a cylinder and a reel therein. The reel is substantially a large pulley with can ways extending axially across its face and covering its entire periphery and made up of suitable shaped members placed in spaced relation to form the can ways. The can ways of all the reels in the assembly are always in axial alignment extending from end to end of the apparatus. Directly over the top of the cylindrical structure is placed an endless conveyor having equally spaced flights thereon, the spacing of the flights equalling the length of one of the cooker units, or substantially so as will be seen later. Since the can ways of the several units making up a complete cooker are always in axial alignment there is of course a continuous can way extending from end to end of the cooker on the top where the conveyor is located, the flights on the under side of the conveyor will therefore always move through this can way when they are in operation and will rest in this same line while out of operation. The reels are mounted on a stationary axle which may be sectional or of one continuous length. A common drive shaft extends from end to end of the apparatus and is located well up on one side of the cylinder and passes through each of the drive mechanisms of the cooker sections. The drive mechanisms for the cooker sections comprises a clutch and an intermittent drive element to give each reel a step by step rotary movement equal to the spacing of the can ways on the reel peripheries.

This apparatus can be made and used as an atmospheric hot water cooker or by enclosing the various mechanisms it is adapted to be used as a pressure cooker using steam or any other suitable element, or using steam and water combined. A more detailed description will appear later in the specification.

It is a principal object of the invention to provide a complete unit for treating food products by sterilization that will embody new and improved methods of construction and operation.

It is also an object to provide a complete unit for treating food or other products wherein the apparatus is made up of a plurality of like sections.

It is also an object of the invention to provide a unit for treating food or other products wherein the severe agitation of the contents of the food containers is eliminated.

It is also an object of the invention to provide a complete unit for treating food products in sealed containers wherein parts of the apparatus may be cut out of operation to give a variable time cook.

It is also an object of the invention to provide a complete unit for treating food products in sealed containers wherein a variable time cook and a variable temperature or pressure may be obtained in different parts of the apparatus.

It is also an object of the invention to provide a complete unit for treating products in sealed containers wherein sections may be removed from the apparatus or sections added to decrease the floor space or the total time of cook or to increase the total time of cook.

It is also an object of the invention to provide an apparatus for treating food products in sealed containers that will take and handle round containers of varying diameters and heights without change or adjustment.

It is also an object of the invention to provide an apparatus for treating food products in sealed containers that will take and handle square or oblong containers of varying heights and diameters without change or adjustment.

It is also an object of the invention to provide an apparatus for the purpose specified that will handle round or square containers interchangeable without change or adjustment.

It is also an object of the invention to provide an apparatus for treating food products in sealed containers that will have the least severe abrasive action on the surfaces of the containers, which will permit the handling of decorated containers without mutilation or defacement.

It is also an object of the invention to provide a universally adaptable unit for the treatment of food products in sealed containers that will permit a graduated temperature to be applied to the product as it is passed through the apparatus.

It is also an object of the invention to provide a universally adaptable unit for the treatment of food products in sealed containers that will permit of using any section as either a cooking or a cooling section as may be desired.

It is also an object of the invention to provide an apparatus for treating food products in sealed containers that is adaptable to either an atmospheric or a pressure device and in which steam and water may be used independently or together.

It is also an object of the invention to provide a variable time cook without changing the speed of the drive mechanism by shortening the path of the cans through the various sections but still passing every can through all of the sections.

It is also an object to provide a bulkhead between sections with an opening only at the top where the cans are given longitudinal movement.

It is also an object of the invention to provide a single conveyor to move all of the cans into and out of the apparatus and through each of the sections comprising the complete unit.

It is also an object of the invention to provide a unitary apparatus for treating food products in sealed containers wherein a single power source drives the entire apparatus or only such parts as may be in operative connection therewith.

It is also an object of the invention to provide a unitary apparatus for treating food products in sealed containers wherein the capacity relative to a given floor space is greatly increased and may be doubled without adding any to the floor space or to the size of the apparatus.

With such objects in view as well as other advantages inherent in the invention, the novel structural peculiarities, novel organization of elements, and the separate and collective operations involved in carrying out the recited objects of our invention, we wish it to be understood that the several necessary elements and combinations constituting the same may be varied in their proportions, placement, general arrangement and operative relation without departing from the nature and scope of the invention. In carrying out the objects of our invention in a concrete form or machine further objects, advantages and improvements have been evolved than have been recited, and in order to make the invention more clearly understood there are shown in the accompanying drawings means and mechanism embodying the preferred structural arrangement and the preferred disposition of the different parts and combinations, in which we have simply illustrated one way of embodying the creative part or concept of the invention. The described devices are simply embodiments of the invention which other structures might also employ and some of the parts and combinations may be used without the others in different types of such apparatus without departure from the purview of our invention and we regard ourselves as entitled to such variations from the shown and described devices as fall within the scope and meaning of the claims hereto appended.

In referring now to the drawings accompanying this application we wish to point out that they are intended to be primarily illustrative, they are not necessarily drawn to scale and some of the parts and combinations may be more or less exaggerated in order to more clearly bring out the invention, and they may or may not represent the best engineering practices as regards structural details.

Figure 1 is a plan of an assembled apparatus showing a number of unit sections arranged end to end and joined together to form a complete operative unit.

Figure 2 is a side elevation of Fig. 1.

Figure 3 is a partial section taken on approximately the line 3—3 of Fig. 2.

Figure 4 is a partial sectional elevation of the feed end of the apparatus taken on substantially the line 4—4 of Fig. 1.

Figure 5 is an end sectional elevation taken on approximately the line 5—5 of Fig. 4.

Figure 6 is a sectional elevation taken on substantially the line 6—6 of Fig. 1.

Figure 7 is a view showing a plan of one of the individual drives for the reel members and is taken on substantially the line 7—7 of Fig. 5.

Figure 8 is a view similar to Figure 3 but shows an arrangement of two tier can ways whereby the capacity of the cooker is substantially doubled.

Figure 9 is a view similar to Figure 5 but showing an inlet valve with the two tier can ways.

Figure 10 is a view of the discharge end of the apparatus when constructed as a pressure cooker.

Referring first to Figs. 1 and 2. For purpose of illustration we have shown an apparatus made up of sections 1, 2, 3 and 4, each section comprising three cooker units 1ª, 2ª, and 4ª, the three's being omitted on account of the broken section. Each cooker unit is provided with a separate and distinct drive mechanism indicated at 1ᵇ, 2ᵇ and 4ᵇ. 5 is the endless conveyor mounted on end sprockets 7 and 8 and carrying equally spaced flights 6. 9 indicates the inlet valve casing, 10 the inlet valve, 11 a can way leading to the inlet valve and 12 an elevator for bringing the cans to the inlet valve. Power being applied to the pulley 13 by a suitable belt will impart continuous motion thereto, the pulley being mounted on a short shaft carried by the housing 14 and inside the housing, see Fig. 6, the interrupted spiral gear 15 is secured to the shaft and receives constant rotative motion with the pulley 13. The Geneva stop plate 20 coacts with the part 19 to form a well known Geneva movement wherein the part 19 has continuous rotation and the stop plate 20 is given intermittent rotation through the pin 18 as is well known in the art. The interrupted spiral gear 15 meshes with the companion gear shown that is secured to the shaft 17, so that both the shafts 16 and 17 are given intermittent rotative movement by the mechanism of Fig. 6, in alternate relation in that when shaft 16 is moving shaft 17 is stationary and when 17 is moving 16 is stationary. The pair of interrupted spiral gears including the gear 15 and its companion is made according to well known methods in the art. The shaft 16 extends the entire length of the apparatus and serves as the driving means for the reel sections and the feeding turret, the shaft 16 extending through all of the individual drives 1ᵇ, 2ᵇ, and 4ᵇ, with a drive gear 21 on the extreme other end meshing with a gear 22 carried by the shaft 23 which also carries the valve or feeding turret 10. The shaft 24 carries a sprocket 7, and extending laterally carries on the outer end the gear 25 which meshing with the gear 26 drives the elevator 12 for delivering the cans to the valve 10.

Each of the drive boxes 1ᵇ, 2ᵇ, and 4ᵇ contains a pin clutch comprising the pin disk 27, Fig. 7, which is secured to the shaft, and the drive gear 28 loosely mounted on the shaft 16 and thrown into and out of engagement with the pin gear 27 by means of the lever 29. The gear 28 driving the reel members 30 as is clearly shown in Fig. 3.

An axle 31 extends centrally through the assembly and does not rotate. This axle may be one continuous shaft, but preferably would be sectional with the sections 1, 2, 3 and 4, or if desired may be sectional with each of the reel sections, having well known locking means for engaging the ends or they may be securely fastened in each section.

Each of the sections 1, 2, 3 and 4 are provided with bulkheads 32 dividing the section into cooker units 1ª, 2ª, etc., with a reel member 33 positioned in each space between bulkheads and mounted for free rotation on the fixed axle 31. Each reel member is substantially a large pulley with can ways arranged entirely around its periphery. The can ways are formed by the spaced members 34, best seen in Fig. 3. These members 34 extend axially across the face of the pulley and are securely bolted thereto. Their outer spaced edges are shaped to form gear teeth which mesh with the drive gears 28 and are driven thereby in step by step rotation, moving the space from one can way to the next at each step and so timed that a can way is always in alignment with the flights 6 on the conveyor 5 extending longitudinally through the top of the apparatus.

In Fig. 4 it will be seen that we have shown groups of six cans being handled at each step movement of the mechanism. It is of course understood that any other group number may be used instead of six.

Water and steam are supplied to each of the cooker unit sections independently as is indicated by the piping shown on Figs. 1 and 2. This arrangement may be followed or any other desired arrangement of the pipes may be used. The only point being that water or steam or water and steam may be supplied to any unit section at will.

In order to double the capacity of a cooker without increasing the overall size of the apparatus we simply run double deck can ways around the reel members so that two groups of cans are handled at each step movement instead of one. This plan is clearly shown in Figs. 8 and 9 wherein the can ways 35 and 36 are shown one over the other, while in the regular machine only the can ways 35 are provided. The flights 6 on the conveyor 5 are lengthened to cover both can ways.

When the machine is originally fitted up as a pressure cooker all of the mechanism is of course enclosed so that there will be the minimum leakage from within the apparatus.

*Operation*

The operation of an apparatus made up according to the drawings herewith will be substantially as follows:

Cans will be delivered from a closing machine, not shown, to the elevator 12 and discharged into the chute 11 which directs them into the 9 o'clock can way of the inlet valve 10, which in the drawings is made to hold a group of six cans in a straight line. As soon as the six cans are in place the valve 10 is given a quarter revolution through the step mechanism previously described. At the same instant that the valve is moving the quarter revolution each reel member that is connected for operation moves a step from one can way to the next through the medium of the intermittent drive mechanism described. At the instant that the reel members and the valve have stopped for their period of rest the conveyor chain moves one step, engaging the six cans in the valve which in its step movement has raised the groups of cans from the 9 o'clock position to the 12 o'clock position, and moves the six cans longitudinally of the machine and deposits them in the can way of the first reel member resting in alignment with the chain flights. As soon as the first six cans are moved from the valve to the reel member, or in other words while the first six cans are being moved from the valve another group of six cans is rolling into the next valve can way at 9 o'clock position, the valve is again given a step movement to the 12 o'clock position; the reel members given another step movement to present another can way in line with the conveyor flights, when the flights will move the second group of six cans into the next can way on the first reel member. This sequence of operation is continued until the entire machine is filled with cans.

We will suppose that the product being processed requires the entire capacity of the cooker. In this case all of the reel members will be connected for operation. We will also suppose that the product requires a uniform application of heat over the entire time of cook and that it is necessary to cool the processed cans before they are released to the atmosphere. In mentioning above that the product will require the entire capacity of the cooker it is understood that one or more unit sections will be utilized for cooling at the end of the cook.

Under the above stated conditions a uniform temperature will be supplied to each of the unit sections required to effect the processing of the product. This heat is applied through filling the unit sections with water through the pipes provided and then sending steam into the water to bring it to the temperature desired. If 212° F. are sufficient to effect the processing steam will be supplied to maintain this temperature. If a higher temperature is required more steam is supplied to create sufficient pressure in the units to raise the temperature of the water to the desired degree. Since the only opening between cooker units is the square opening 37 through which the cans pass from unit to unit and through which the conveyor flights move there will be a uniform pressure between unit sections, and a uniform temperature if the steam supplied to each section is controlled properly. One or more of the last unit sections of the cooker will be required for cooling. If only one is needed there will be no steam supplied to this section, which may be kept cool with a hot section next to it by supplying a circulating water supply and letting it overflow into the drain, or the water flow may be intermittently supplied to cool the water if it becomes too warm from constant use. If the processing has been under pressure then the cooling will be effected under the same pressure because the communicating opening 37 is continuous from section to section throughout the apparatus, and since the inlet valve and outlet valve practically close each end of the continuous can way which the conveyor chain moves through there is practically no leakage of pressure from the machine, but there is always a balanced pressure throughout the machine.

We will now suppose a condition where a product is being processed that requires a low heat at the start of the processing with a gradual increase to the top heat required and then a reduction of temperature toward the end of the process with the cooling step before discharging. In this case the sections will all be filled with water, the steam supply graduated from the beginning to the center where it will be hottest and then again graduated toward the end of the process to a cooler temperature and from there through the cooling section.

This graduated temperature can be maintained whether the processing is at ordinary boiling or at pressure, since the temperature is under control regardless of the pressure employed in the processing. The pressure and temperature gauges provided for each unit section provide visual evidence of the pressure and temperatures employed.

We will now suppose a condition where a product is being processed that requires only half the processing time that the machine is capable of providing. Since each unit section is independently operated, any one or any number may be disconnected from operation. When any unit is disconnected the reel member simply stands still and one of the can ways is always lined with the movement of the conveyor chain so that the cans are passed through the top can way of the idle member and deposited in the next reel, and if it happens that the next one is also idle they are moved on into the next operating reel in the assembly. The operator may conduct the processing in as many of the first group of unit sections as are required to effect the process or he may utilize alternate units or he may use the latter portion of the cooker with a cooling step, any combination desired is at his disposal.

After the cans leave the cooling unit they are passed from the machine through a valve that is substantially the duplicate of the inlet valve if the cooker has been constructed for processing under pressure, which valve is shown in Fig. 10, while if the machine was originally constructed as only a hot water cooker then they may be discharged into a goose neck chute indicated at 38. The object of the goose neck chute is to retard the fall of the cans.

It is readily seen from the above illustrations that this cooker is capable of meeting any possible conditions met with in canning factory practice.

Let us now consider some other details of operation.

In the first place this cooker agitates the product sufficiently to create a circulation of the liquid contents of the cans but does so in a manner that does not tend to break down the cell structure of solid particles or cause a rubbing of particles of the contents to change or alter their shape. It will be noted that each time a reel member is moved a step by the intermittent mechanism the cans will receive a very slight jar and also as the reel member is gradually carried around the circle the cans are gradually turned end over end so that each can is turned end over end once for each reel revolution. If there are 12 reel units in the cooker each can passing therethrough will be turned end over end 12 times. The can ways on the reel members are slightly larger than the largest can that will be handled, so that as the reels are intermittently rotated the cans will slide from side to side and from top to bottom of the can ways and thereby get additional slight jars that helps to create a circulation of the contents. We have found through long experience with canning factory practice that the very slight jars and the turning end over end that the cans receive in passing through this cooker give all the agitation that a very large proportion of the canned products need for perfect processing and holding the solid portions of the contents intact and unchanged. Where more agitation is required than is provided with this normal operation means for imparting added vibration to the cans will be supplied.

Another very desirable feature of this cooker is its ability to handle both round or square cans alternately without change or adjustment and to handle as well cans of varying heights and diameters without change or adjustment. This feature is very important to the canner as it enables him to run a great variety of products at the same time and group the products through the cooker varying the heat and pressure and time to suit without stopping the machine for making adjustments, or he can change the size of the cans within reasonable limits and run them through in any order desired without change of adjustments or parts.

As a summary of the advantages inherent in this invention the following may be mentioned.

By making up a cooker having a plurality of independent compartments and a short reel member in each compartment, with bulkheads separating each compartment and with the reel member substantially filling the compartment the groups of cans are easily held in position while being carried around with the reel members, and the reels being small they carry a limited number of cans and are therefor comparatively light when loaded and are easily stopped and started.

By providing compartments separated by bulkheads the axle carrying the reels may be supported at short intervals and therefor easily kept in perfect alignment so that the reels will rotate freely and will all be maintained in proper alignment. Axle bearings may be had in each bulkhead which permits building the cooker in sections comprising several unit sections or in sections of single units if desired, with a short axle in each section and which will thereby be held in perfect alignment when assembled into the complete cooker.

By using water and steam there is a much better distribution of heat. The entire body of water will reach and maintain a uniform temperature without forming pockets as is the case where steam alone is used. By using the steam to heat the water a variable temperature may be maintained in the different compartments or all may be maintained at substantially the same temperature. In hot water cooking it has been found that the heat penetration is much better and more rapid because each can is completely surrounded and in contact with the heat medium and this method is gaining in favor among canners.

In a product requiring a step up temperature and then a step down temperature during the processing this cooker will permit of a range of temperatures starting around 140° F. up through 250° F. and down to as low as 100° F. these figures of course being illustrative only. The can way opening between compartments permits an equalization of pressure but does not permit a material interchange of temperature between compartments which is possible through the steam control provided.

By means of the individual drives for the reels we can get as many different cooks as there are reels in the assembly. If we have 12 reels we can have twelve different temperatures and all at the same pressure which means that the cans are not subjected to different pressures due to different temperatures and therefor no undue or unnecessary strains are applied to the cans to affect the seals.

By handling the cans in batches we are able to give more time to the intermittent mechanism and still maintain the speed of cans per minute passing through the machine up to the required number to take care of the cans coming from the commercial closing machines. For example 120 cans per minute is the present approximate maximum capacity of canning lines. By handling the cans in batches of six the intermittent mechanism has only to operate twenty times per minute which is very favorable for power consumption, wear and tear on mechanism and greatly reduces noise of operation.

By means of the separate compartments with only pressure connection between compartments no transfer valves are necessary to go from a cooking to a cooling temperature. The single conveyor chain serves all compartments and the inlet and outlet valves practically confine the pressures within the cooker and the variable temperatures possible in the individual compartments permits passing from the hottest required temperature to the coolest required.

A very great advantage found in this invention is the upright position of the cans. Where cans are rolled in a horizontal position severe strains are transmitted to the cans and much of the tin coating is worn off by abrasive action which materially aids rusting while in storage. The longitudinal movement is always in the upright position and in a twelve section cooker only twelve such movements are made while in control of the reels and only twelve end over end movements are imparted to each can in passing through the entire machine while in a spiral can way type of cooker of substantially the same capacity the cans would be turned on their axes many hundreds of times.

Revolving cans on their axes during processing has a harmful effect on many products, notably those that are diced where it is desired to maintain the sharp edges of the diced product. Other products that are distinctly harmed by rolling the cans are corn, milk, soup, peas, berries and in fact any product that is contained within a liquid which permits the particles to rub against each other and thereby cause a breaking up of the cell structure. The end over end movement given the product by our invention permits the heat to penetrate very rapidly and keeps the product from rubbing or tending to separate from the effect of centrifugal action. The very slight jar given the product in our cooker gives sufficient agitation to produce the very best results.

Another very great advantage rests in being able to run cans of varying sizes and shapes without any change or adjustment in the apparatus. This feature is more important than would appear on its face. Varying perishable products come to the canners during a day's run and many times it means immediate handling to save them from decay and loss, and sometimes they must be sandwiched between other products that must also be handled without delay. With our cooker having the ability of handling varying sizes and shapes of cans without change or adjustment the canner needs only to place the perishable product into the cans and run it through the machine simply adjusting the temperature to suit, which may be done in a very few minutes by means of the combination of water and steam in the separate compartments.

Another desirable advantage inherent in our cooker is the variable water level that may be carried. If the bulkheads are made water tight except at the openings where the cans pass from one compartment to the other, the water level may be carried clear up to this opening thus using approximately seven eights of the compartment space for water in all or only in certain compartments. If certain compartments happen to be cut out of operation there need be no water in them which results in a saving of water and steam. It is also obvious that any section may be run hot or cold by a simple manipulation of the water and steam controls. The pressure gauges and the thermometers give visual assurance of what is taking place in the compartments.

Rather more of the area of the cooking zone is utilized by our arrangement and manner of handling the cans than is ordinarily experienced in cylindrical cookers. For example, the reels in the several compartments are close together, being separated substantially the thickness of the bulkheads, the group of six cans therefor just about fills the space from bulkhead to bulkhead with just sufficient space between the groups to provide a free resting place for the conveyor fingers 6 while the reels are given their step movement. The position of the flights 6 are shown at rest in Fig. 4, the flight at the extreme right of the view is shown occupying a space substantially the thickness of the bulk head. Of course this space will vary somewhat with a change in the diameter of the cans being handled. The cans in this view are the largest that would be handled with the construction shown. The exact location of the finger relative to the last can in the group is not technically correct in this view, it should be shown resting against the last can since there is no back movement in the conveyor, in which case the end of the space member 34 would be a little shorter so as not to contact with the finger when the reel is moving, however, if the fingers were considered correct as shown the column of cans would be moved slightly along the can way when the reel moved by coming in contact with a beveled edge of the opening 37 in the bulkhead which would place the group in the position shown as soon as they had passed the opening 37.

While the double deck can way as shown in Fig. 8 permits of doubling the capacity of the cooker without increasing overall dimensions, it possesses another very important feature, in that two different size cans holding the same or different products may be handled at the same time, or two different products may be handled at the same time in the same size cans. The only requirement is that the products would require the same processing time and temperature. This is a wonderful advantage for a canner since he practically has two cookers occupying the space of one and is able to handle equal quantities of either product at the same time, and along with this facility he may change from atmospheric to pressure without any change other than temperature.

What we claim as new and desire to secure by Letters Patent is:

1. An apparatus for processing canned goods comprising a processing unit made up of a plurality of axially arranged separated chambers, an independently movable member in each chamber separate means for imparting step by step movement to each member, endless conveyor serving all of the chambers whereby cans are moved by said conveyor from chamber to chamber to complete a processing cycle.

2. An apparatus for treating canned goods comprising a plurality of treating chambers separated from each other except for can passage ways, can receiving and moving means in each chamber, a conveyor serving all chambers, independent drive means for each can receiving and moving means in said chambers whereby any of said can carrying and moving means may be cut out of operation during a treating cycle.

3. An apparatus for treating canned goods comprising a cylindrical casing, bulkheads in said casing arranged to form a series of axially aligned compartments, independently mounted means in each compartment for receiving and moving canned goods, independent engageably drive mechanism for driving the can moving means in each compartment, an endless conveyor serving all compartments and adapted to move cans successively to the several compartments simultaneously.

4. An apparatus for treating canned goods comprising a casing, a series of compartments in said casing, a straight can way through said compartments, a conveyor located in said straight can way, reel members in each compartment adapted for free and independent rotation, optionally disengageable means for imparting intermittent movement to each of said reel members, means for imparting intermittent movement to said conveyor, the said conveyor being timed to remain idle when said reel members are moving with means for supplying treating medium to said compartments.

5. An apparatus for treating canned goods comprising a series of compartments arranged in operative relation, means for delivering cans to each compartment, means for moving the cans intermittently through each compartment, independent drive means for moving the cans in each compartment, means for disconnecting the drive means of any compartment so that the moving means will not carry cans through said compartment.

6. A means for treating products comprising a series of compartments arranged in operative relation, means for moving product intermittently into and through each compartment, controllable means in each compartment for treating said product while therein whereby a different treatment may be given in each compartment with means for shunting the product past any compartment to reduce the number of treatments or the total time of treatment.

7. A means for treating products comprising a series of compartments arranged in operative relation, means for moving product intermittently into and through each compartment, controllable means in each compartment for treating said product while therein whereby a different treatment may be given in each compartment, means for suspending the movement of the product moving means in any compartment to vary the total time of treatment of product.

8. An apparatus for treating canned goods comprising a series of compartments arranged in operative relation with a passage way leading through all compartments, a reel in each compartment, can ways carried by said reels, the can ways on said reels always being in longitudinal alignment, a conveyor adapted to move through the aligned can ways of said reels in succession to deliver cans to each reel and transfer cans from reel to reel, means for suspending movement of any reel but permitting passage of cans through a can way thereon to shorten the time of treatment.

9. An apparatus for treating canned product comprising a series of compartments arranged in operative relation with a passage way leading through all compartments, a reel in each compartment, means for giving intermittent rotation to each reel independently, can ways carried by each reel which are always in longitudinal alignment, a conveyor adapted to move through a series of aligned can ways to transfer cans from reel to reel, means for giving intermittent movement to said conveyor, alternating with the intermittent movement of said reels, means for suspending movement of any reel but permitting passage of cans therethrough to thereby shorten the time of treatment, with means in each compartment for supplying treatment to said product while therein.

10. An apparatus for treating canned product comprising a series of compartments arranged in operative relation with a passage way leading through all compartments, a reel in each compartment mounted on a stationary axle, means for imparting intermittent rotation to each reel independently, can ways arranged around the peripheries of said reels and always lying in longitudinal alignment, a conveyor adapted to move through a series of aligned can ways on said reels to transfer cans from reel to reel and to deliver cans to and away from said reels, means for imparting intermittent movement to said conveyor in alternating relation to the movement of said reels, means in each compartment for treating said product while therein, means for controlling said treating means whereby a different treatment may be given in each compartment, and means for suspending movement of any reel to thereby vary the time and manner of treatment.

11. An apparatus for cooking canned goods having a series of compartments arranged for successive movement of cans therethrough, a series of double deck can ways in each compartment and arranged to move therein, said can ways always lying in longitudinal alignment, a conveyor moving through two superposed can ways in each compartment and simultaneously moving cans therethrough, means for moving said can ways through said compartments and means for moving said conveyor, means for treating canned goods while in each compartment and means for admitting and discharging cans from said apparatus.

12. An apparatus for treating canned goods comprising a series of compartments arranged in operative relation, a series of double deck can ways located in each compartment, means for supporting and moving said can ways through said compartments, said can ways always lying in longitudinal alignment, a passage way through all compartments with which one of said can ways of each series is always in alignment when cans are being moved therethrough, a conveyor moving through said passage way and through the aligned can ways in said compartments, means for moving said conveyor and means for moving said double deck can ways in alternating relation so that cans may be transferred from compartment to compartment and into and through both can ways of the double deck group with means in each compartment for treating the product while therein.

13. An apparatus for treating canned goods comprising a series of sections adapted to be secured together to make a complete unit, each section comprising a series of treating compartments, means for moving cans into and out of each compartment, means in each compartment for treating the product while therein, means for moving the cans through each compartment to receive treatment and disengageable means for varying the time of treatment while the cans are passing through the entire unit.

14. An apparatus for treating articles comprising a plurality of treating chambers each having a circular path therethrough, means in each chamber for moving articles therethrough, independent drive means for each moving means, means for disconnecting any one of said drive means at will to permit articles to pass by that treating chamber, means for moving articles from chamber to chamber for treatment, the same means moving articles into and out of said apparatus.

15. An apparatus for treating articles comprising a plurality of treating chambers each having a circular path therethrough, means in each chamber for moving articles therethrough, independent drive means for each moving means, means for disconnecting any one of said drive means to render that chamber inactive, a conveyor means moving through a longitudinal path that intercepts all of the said circular paths to deliver articles to said chambers and to move articles away from said chambers.

16. An apparatus for treating articles comprising a cylindrical casing, bulkheads in said casing spaced to form treating chambers, an independently moving conveyor in each chamber, means to drive each conveyor, means for disconnecting the drive means of any conveyor at will so that the chamber served by that conveyor becomes inactive as a treating means, another conveyor serving all of said chambers and moving through a longitudinal path intercepting all of said chambers to deliver and move articles to and past said chambers whether active or inactive.

17. An apparatus for treating articles comprising a cylindrical casing, bulkheads in said casing spaced to form treating chambers, an independently moving conveyor in each chamber, means to drive each conveyor, means for disconnecting each conveyor at will, another conveyor for moving articles to and past said chambers for treatment, drive means connecting the drive means in said chambers and the second mentioned conveyor to move them in timed relation.

18. An apparatus for treating canned goods comprising a treating chamber, a plurality of independently movable reels in said chamber, means for optionally moving all of said reels in unison or for suspending movement of any thereof independent of those still moving, endless conveyor means for moving canned goods into and through said reels for treatment and means for imparting intermittent movement in one direction only to said endless conveyor means.

19. An apparatus for treating canned goods comprising a treating chamber, a plurality of independently movable reels in said chamber, each reel being positioned in a separate compartment in said chamber and each reel having the same capacity for carrying canned goods, means for optionally rotating all of said reels in unison or for suspending any of said reels while the remainder are moving, an endless conveyor means for moving canned goods into and through said reels in succession for treatment and means for moving said endless conveyor step by step and always in the same direction.

20. An apparatus for treating canned goods comprising a treating chamber, a plurality of movable can carrying members in said chamber each member having the same can carrying capacity and each member being positioned in a separate compartment, drive means connecting with each member, means associated with said drive means to suspend operation of any individual member and allow the other members to continue operation, an endless conveyor for moving canned goods into and through each reel in succession for treatment and means for moving said endless conveyor step by step and always in the same direction.

21. An apparatus for treating canned goods comprising a treating chamber, a plurality of movable can carrying members in said chamber, bulkheads in said chamber separating each can carrying member from each adjacent member, each of said members having the same can carrying capacity, drive means connected with each can carrying member, each drive means being capable of operation independent of the other drive means whereby any can carrying member may be suspended from operation while other members continue to operate, with conveyor means for moving canned goods from member to member for treatment said conveyor always moving in the same direction.

22. An apparatus for treating canned goods comprising a treating chamber, a plurality of independently movable can carrying members in said chamber, bulkheads in said chamber equally spaced axially thereof to form a plurality of equal sized compartments with a can carrying member in each compartment, each can carrying member having the same carrying capacity, drive means connected with each can carrying member, means associated with each drive means for suspending operation of the can carrying member connected therewith, independent of the other can carrying members, a conveyor member always moving in the same direction for intermittently moving groups of canned goods from compartment to compartment for treatment.

23. An apparatus for treating canned goods comprising a treating chamber, a plurality of bulkheads equally spaced in said chamber to form a plurality of treating compartments of substantially the same cubic capacity, unconnected can carrying members in each compartment mounted for independent movement therein, a canway leading from compartment to compartment for passing cans therethrough, an endless conveyor for moving cans through said canway from compartment to compartment, parts of said conveyor always remaining in said canway, means for imparting step by step movement to said conveyor to move cans therethrough, a single drive means for all of the can carrying members with separate clutch means connecting each can carrying member to said drive means whereby any desired can carrying member may be thrown out of operation.

24. An apparatus for treating canned goods comprising a treating chamber, a plurality of independently movable can carrying means in said chamber, means for optionally moving any or all of said can carrying members, an endless conveyor for moving cans to and through said can carrying members, fixed flights on said conveyor for engaging groups of cans and moving them relative to said carrying members, means for imparting step by step movement in alternate relation to said carrying members and said conveyor, said fixed flights on said conveyor resting between can carrying members while said members are moving.

25. An apparatus for treating canned goods comprising a treating chamber wholly enclosed against atmosphere, means for obtaining a pressure in said chamber above atmosphere, means for admitting liquid to said chamber, means for separating said chamber into a series of compartments tight against liquid interchange but open for pressure interchange, a can carrying means in each of said compartments, a single means for conveying cans into and through each compartment, with means for obtaining a different temperature in each compartment.

26. An apparatus for treating canned goods comprising a treating chamber wholly enclosed against atmosphere, means for obtaining a pressure in said chamber above atmosphere, means for admitting liquid to said chamber, means for separating said chamber into a series of liquid compartments tight against liquid interchange but open for pressure interchange, an independently mounted can carrying member in each compartment, means for moving each can carrying member independently of all other members and an endless conveyor for moving cans from compartment to compartment.

27. An apparatus for treating canned goods comprising a treating chamber wholly closed against atmosphere, means for obtaining a pressure within said chamber above atmosphere, means for admitting liquid to said chamber, means for dividing said chamber into a series of compartments of substantially equal size, said compartments being tight against liquid interchange but open for pressure interchange, an independently mounted can carrying reel in each compartment, independently controlled drive means for each of said reels, a single source of power for all of said reels, an endless conveyor for moving canned goods from reel to reel, a pressure tight feed device for feeding cans into said treating chamber and a pressure tight device for delivering cans from said chamber.

28. An apparatus for treating canned goods comprising a treating chamber wholly enclosed against atmosphere, means for dividing said chamber into a series of substantially equal size compartments, said compartments permitting pressure interchange but being tight against liquid interchange, means for supplying pressure and liquid to said compartments, said pressure means also acting as temperature means with control means for varying the temperature in adjacent compartments while the pressure in all compartments remains constant, means in each compartment for receiving and moving canned goods therethrough and a single conveyor for moving cans into and through said compartments and in operative relation with said moving means in each compartment said conveyor always moving in the same direction, with drive means for imparting independent movement to each can moving means in each of said compartments.

29. An apparatus for treating canned goods comprising a treating chamber, means for dividing said chamber into a substantially equally dimensioned series of compartments, a can carrying reel in each compartment independently mounted for individual rotation, means for rotating said reels singly or in unison, a series of radially disposed canways around the periphery of each reel and each series occupying different radial planes, means for simultaneously moving canned goods into and through radial canways in said reels in step by step sequence, means for supplying treating medium to said chamber and means for obtaining and maintaining heat in said treating medium.

30. An apparatus for treating canned goods comprising a treating chamber, a series of compartments in said chamber, can carrying means in each compartment, a conveyor for moving cans through said compartments in operative relation with said can carrying means therein, a continuously moving drive shaft extending axially with said compartments, an intermittent drive means associated with said drive shaft for operating said conveyor, other intermittent drive means associated with said drive shaft for operating said can carrying means in each compartment and disengaging means associated with said last mentioned intermittent drive means to optionally suspend movement of any can carrying means, in any compartment.

31. An apparatus for treating canned goods comprising a treating chamber, a series of independently rotatable reels therein, each reel being provided with a series of longitudinal canways, means for rotating the reels in unison to maintain the said canways in longitudinal alignment, means for moving cans along said canways from reel to reel and means for optionally disconnecting any reel from the rotating means so that it will not rotate with the other reels.

32. An apparatus for treating canned goods, a series of independently rotatable reels therein, a chamber in which said reels rotate, each reel being provided with a series of longitudinal canways, means for intermittently rotating said reels in unison step by step whereby the canways are always in longitudinal alignment and provide continuous canways entirely through said chamber, means operable while said reels are resting for moving cans along one of said continuous canways through said reels between each step, and means for optionally disconnecting any reel from the rotating means so that the disconnected reel will remain at rest during the movement of the other reels, but having a canway to align with the canways in the other reels when all reels are at rest.

33. An apparatus for treating canned goods, a treating chamber, a series of independently rotatable reels therein, each reel being provided with a series of longitudinal canways for receiving groups of cans, means for giving intermittent rotation to said series of reels to carry the cans around through circular paths within said chamber, means for advancing groups of cans from reel to reel while said reels are at rest, and means for disconnecting any reel from said rotating means so that it will remain at rest while said other reels of the series continue to move, but having the longitudinal canways all in alignment when all reels are at rest.

In testimony whereof we affix our signatures.

WILLIAM DE BACK.
OGDEN S. SELLS.